July 26, 1949.　　　T. L. FAWICK　　　2,477,447
FLEXIBLE COUPLING

Filed Aug. 16, 1943　　　　　2 Sheets-Sheet 1

INVENTOR.
Thomas L. Fawick
BY
Willard D. Eakin
ATTORNEY

July 26, 1949.　　　T. L. FAWICK　　　2,477,447
FLEXIBLE COUPLING
Filed Aug. 16, 1943　　　　　　　　　2 Sheets-Sheet 2

INVENTOR.
Thomas L. Fawick
BY
Willard D. Eakin
ATTORNEY

Patented July 26, 1949

2,477,447

UNITED STATES PATENT OFFICE 2,477,447

FLEXIBLE COUPLING

Thomas L. Fawick, Akron, Ohio

Application August 16, 1943, Serial No. 498,770

5 Claims. (Cl. 64—11)

This invention relates to flexible couplings such as are employed for connecting a driving shaft with a driven shaft.

Its chief objects are to provide a coupling having superior characteristics for adjustable cushioning of the torque and for compensation for shaft misalignment without excessive localization of strains; to provide simplicity and economy of construction, assembly and repair; to provide durability; and to provide an improved coupling adapted for the sustention of axial thrust.

A more specific object is to provide an improved coupling adapted for pre-adjustment of the resilience characteristics of torque-cushioning assemblies individually, before a plurality of them are mounted in the coupling, so that they will act uniformly in compensating shaft misalignment and each sustain its proper share of the torque.

Another more specific object is to provide a coupling having some or all of the advantages mentioned and yet of small axial dimension.

Figure 1:
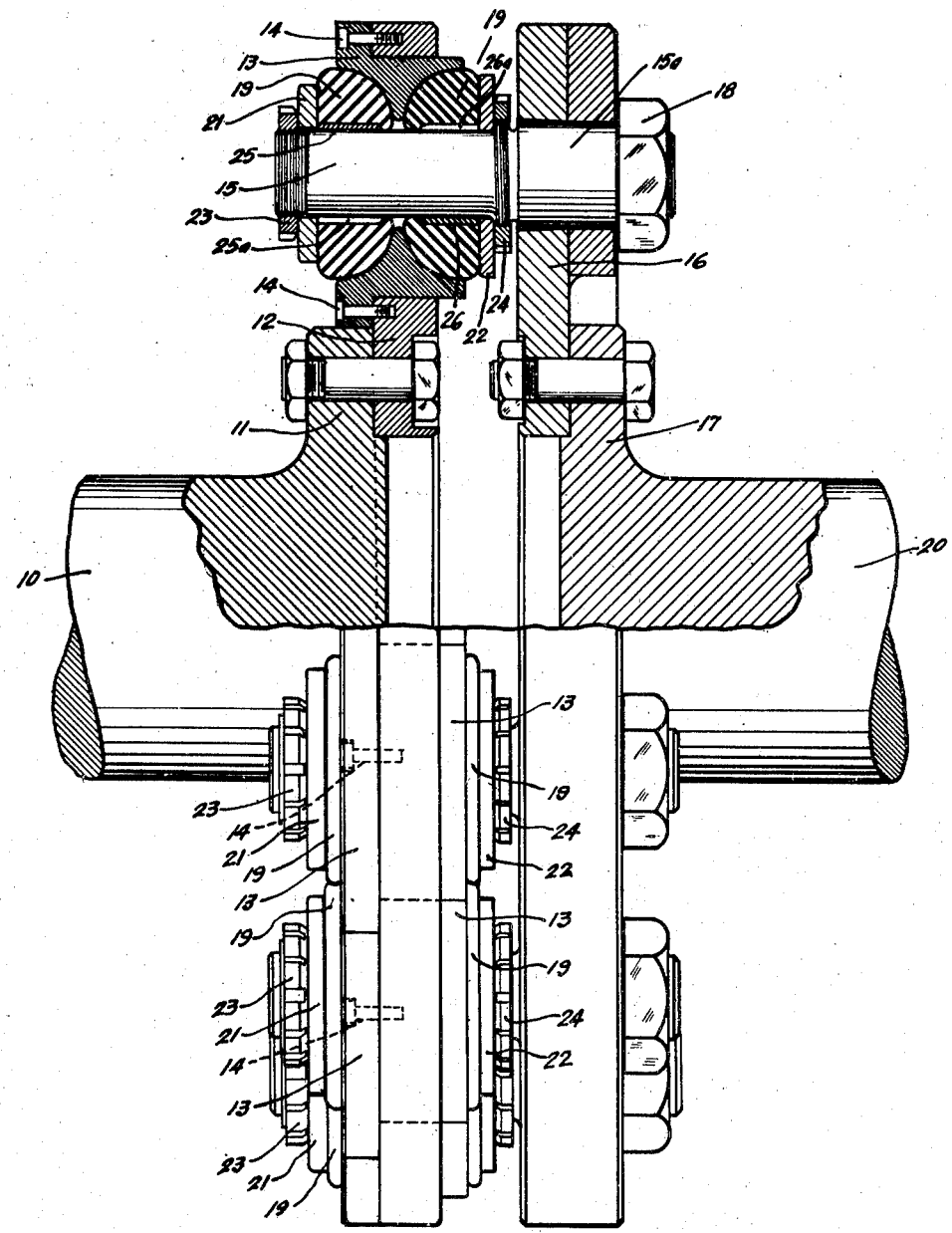
Fig. 1 is a side elevation, partly in section, of a coupling embodying my invention in its preferred form for sustention of axial thrust.
Figure 2:
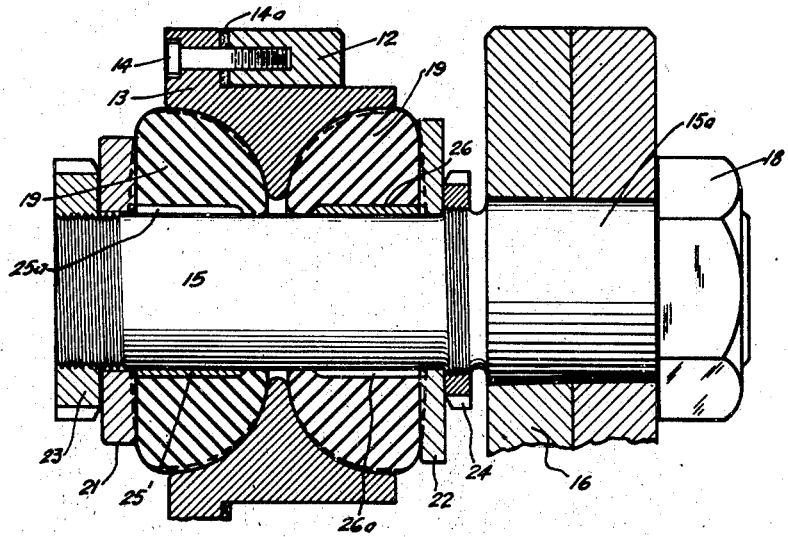
Fig. 2 is a fragmentary section of the same on a larger scale.

Referring to the drawings, the coupling shown in Figs. 1 and 2 comprises at least approximately aligned shafts 10 and 20. The shaft 10 has an end flange 11 upon which is bolted an annular coupling member 12 formed with a circumferentially spaced series of holes receiving respective flanged thimbles 13, 13 which are secured to the member 12 by screws 14, 14 extending through their flanges.

Each thimble 13 is formed in its opposite ends with socket recesses which preferably are of hemispherical or approximately hemispherical form and are connected by an aperture for the accommodation of a stud bolt 15 which projects axially from an annular coupling member 16 which is bolted to an end flange 17 formed on the shaft 20, the stud-bolts 15 preferably being formed with tapered seating portions 15ª fitting complemental holes in the member 16 and provided with securing nuts 18.

In each of the hemispherical sockets of the thimbles 13, and mounted on the stud bolt 15, is a bushing-like cushioning member 19, of a material having substantially the resilient deformability of vulcanized soft rubber.

The cushion members 19 of each pair are held in their sockets under variable compressive force by washers 21, 22 backed by nuts 23, 24 threaded upon the stud bolt 15.

The cushion members 19 are pre-loaded by setting up of the nuts 23 and 24 and their cushioning characteristics can be varied according to the setting up of the nuts. Thus they can be heavily pre-loaded for the transmission of heavy torque or lightly pre-loaded for light torque, and undesirable sympathetic or harmonic vibration can be eliminated by changing the setting of the nuts 23, 24 and thus changing the natural rate of vibration in the assembly.

With the spacing of the annular coupling members 12 and 16 predetermined, the right-hand and left-hand cushions can be put under substantially the same axial compressive force by adjustment of the nuts 23, 24, or, if axial thrust, such as the thrust of a marine propeller, is to be sustained by the coupling, the axial spacing of the members 12 and 16 under no thrust load can be adjusted by adjustment of the nuts. Also, by setting up or backing away of the nuts of the individual pairs the characteristics of the several cushioning assemblies can be made uniform throughout the series as to pre-loading for torque and as to sustension of axial thrust.

In Fig. 2 the dotted lines show the form in which the cushion members preferably are molded, so that they undergo a slight change of form in being forced into firmly seated relation in their sockets by the nuts 23, 24.

Their shape when in unstrained condition being as there shown by the dotted lines, a very light pre-loading causes them to seat firmly against the walls of their respective sockets only in the vicinity of their inner ends, and consequently in the relative weaving movement of the two coupling members 12 and 16 which is incident to angular shaft misalignment the deformation of the two cushion members of each pair occurs in a region, common to the two inner ends of the two cushion members, in which is located the axis or center of tilting movement of the stud bolt 15 in relation to the thimble 13. Thus the amount of deformation of the cushions is small and the coupling accordingly is not stiffly resistant to shaft misalignment.

Heavier preloading, effected by further setting up of the nuts 23, 24, progressively increases the area of firm seating of the cushion members in their sockets, and by reason of that, as well as because of the increase of the compressive force, the resilience characteristics of the cushions is changed, and the assembly is made less yielding as to transmission of torque and also as to sustension of axial thrust.

Preferably each cushion member 19 has vulcanized to its inner peripheral face a transversely split ring 25 or 26 of relatively stiff reinforcing material, preferably metal, the split, shown at 25ᵃ and 26ᵃ, permitting the bushings to be readily slipped onto the studs with a snug fit and then permitting the radial forces in the bushings or cushion members to be transmitted to the stud bolts 15 while transmitting axial forces from the nuts 23, 24 to the axially inner regions of the cushions, for the progressive spread of the firm-contact areas above referred to, the contact of the washers 21, 22 with the cushions also being progressive, from the inner peripheries toward the outer peripheries of the washers and of the bushings.

Preferably the hole in the thimble 13 which connects the two cushion sockets is substantially larger than the stud bolt 15, to permit relative tilting movement of the latter, and preferably the transversely split reinforcing rings 25, 26 terminate at their inner ends somewhat short of the termini of the cushion members, and are there beveled as shown, to develop directly sustained oblique compressive strains in the cushions near their inner ends while, with the over-size of the hole connecting the thimble's cushion sockets, flow space is provided for permitting the cushioning material to act resiliently as distinguished from being held pocketed as substantially "dead" material, such materials usually being substantially incompressible in volume.

In this embodiment, shown in Figs. 1 and 2, individual assemblies each comprising a thimble 13, a pair of cushion members 19, a stud bolt 15, a pair of washers 21, 22 and a pair of nuts 23, 24, can be pre-assembled and determinately pre-loaded, by setting up of the nuts, and each such assembly can be individually tested as to amount of preloading and as to resilience characteristics for torque transmission and for thrust sustension, and the set of sub-assemblies thereafter brought into association in the complete coupling assembly. Each such sub-assembly is adapted to be presented to the coupling members 12 and 16 from the left as viewed in Figs. 1 and 2, the tapered portion 15ᵃ of the stud bolt 15 passing through the hole in the member 12 and seating in the member 16 as the thimble 13 seats in the member 12, after which the final anchorage is effected by means of the screws 14 and the nuts 18. Shims such as the shim 14ᵃ shown in Fig. 2 can be employed for substantially eliminating thrust load upon the cushions in installations in which the coupling members 12 and 16 are held in fixed axially spaced relation by means other than the coupling assembly.

Figure 3:
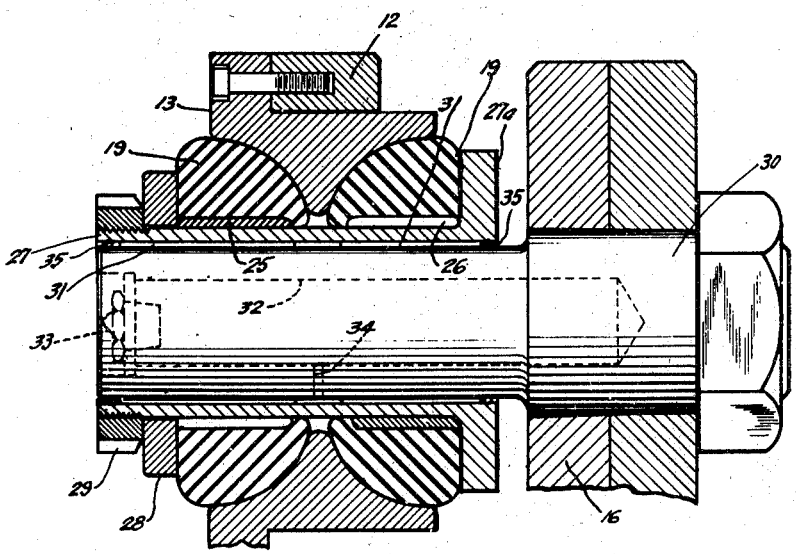
Fig. 3 is a fragmentary section of a coupling embodying my invention in its preferred form for pre-adjustment of the cushioning assemblies.

In the embodiment shown in Fig. 3 the cushioning members 19 and their reinforcing rings 25, 26 are slidably mounted upon a sleeve 27 having a radial flange 27ᵃ at one end and provided with a washer 28 and nut 29 at its other end for preloading the cushion members.

The sleeve 27 with the cushions 19 and thimble 13 thereon is then slipped endwise onto a stud-bolt 30 projecting from the coupling member 16, with anti-friction bushings 31, 31 mounted, with a tight fit, in the sleeve. The stud bolt 30 is formed with an axial bore 32, provided with a grease fitting 33, for lubrication of the bushings 31, the axial bore 32 communicating with a transverse bore 34 adapted to conduct lubricant to a space between the adjacent ends of the bushings 31.

To prevent escape of grease at the ends of the sleeve 27 the latter is formed adjacent each end with an internal annular groove in which is seated a ring 35 of rubber-like but oil resistant material which seals against the stud bolt 30 but is slidable thereon in the axial movement of the stud 30 in the sleeve 27 which is incident to angular shaft misalignment.

In this embodiment, as in that of Figs. 1 and 2, the cushioning sub-assemblies can be individually preloaded determinately and tested as to resilience characteristics before they are brought into association with each other and with the other members in the complete coupling assembly.

Alternatively, they can be first mounted upon their respective studs 30 after the latter are in place and secured to the coupling member 12 by the screws 14, and thereafter preloaded by setting up of the nuts 29, with equalization of axial pressure upon the two cushions of each pair assured by reason of the fact that the sleeve 27 is axially slidable upon the stud 30.

A further advantage of the slidability of the sleeves 27 upon the studs 30 is that when the coupling is used in association with herringbone gears they are permitted to align themselves in relation to each other for equal torque sustained by the two sides of each set of herringbone teeth and without any thrust load upon the coupling.

Other modifications are possible within the scope of the invention as defined in the appended claims.

I claim:

1. A coupling assembly comprising a pair of at least approximately coaxial rotary coupling members, one of the same having a circumferential series of sockets for respective cushion members, a circumferential series of studs projecting from the other coupling member into said sockets respectively, a cushion member of resiliently deformable material mounted in each socket and bearing against the stud therein, a pair of clamping members mounted on each stud and respective means for moving both of them toward each other thereon and with relation to both of said coupling members for clamping the cushion member.

2. A coupling comprising a pair of at least approximately coaxial rotary coupling members, one of the same having a circumferential series of pairs of oppositely facing, communicating sockets for respective pairs of cushion members, a circumferential series of studs projecting from the other coupling member and through respective pairs of the sockets, a cushion member of resiliently deformable material mounted in each socket and bearing against the stud therein, a pair of clamping members mounted on each stud and respective means for moving both of them toward each other thereon and with relation to both of said coupling members for urging the cushion members toward each other.

3. A coupling comprising a pair of at least approximately coaxial rotary coupling members, one of the same having a pair of oppositely facing communicating sockets for respective cushion members and the other having a part projecting through said sockets, a cushion member of resiliently deformable material mounted in each socket and bearing against said part, a pair of clamping members mounted on said part and respective means for moving both of them toward each other thereon and with relation to both of said coupling members for urging the cushion members toward each other.

4. A coupling assembly comprising a pair of at least aproximately coaxial rotary coupling members, one of the same having a circumferential series of sockets for respective cushion members, a circumferential series of studs projecting from the other coupling member into said sockets respectively, a cushion member of resiliently deformable material mounted in each socket and bearing against the stud therein, and a pair of clamping members mounted on each stud and movable toward each other thereon and with relation to both of said coupling members for clamping the cushion member, the cushion member including a layer of relatively stiff reinforcing material.

5. A coupling comprising a pair of at least approximately coaxial rotary coupling members, one of the same having a circumferential series of pairs of oppositely facing, communicating sockets for respective pairs of cushion members, a circumferential series of studs projecting from the other coupling member and through respective pairs of the sockets, a cushion member of resiliently deformable material mounted in each socket and bearing against the stud therein, and a pair of clamping members mounted on each stud and movable toward each other thereon and with relation to both of said coupling members for urging the cushion members toward each other, each of the cushion members including a layer of a relatively stiff reinforcing material.

THOMAS L. FAWICK.

REFERENCES CITED

The following references are of record in the file of this patent:

UNITED STATES PATENTS

| Number | Name | Date |
| --- | --- | --- |
| 764,103 | Baehr | July 5, 1904 |
| 1,396,979 | Thomas | Nov. 15, 1921 |
| 1,606,966 | Smith-Clarke | Nov. 16, 1926 |
| 1,760,492 | Hall | May 27, 1930 |
| 1,820,750 | Lord | Aug. 25, 1931 |
| 1,871,918 | Rossman | Aug. 16, 1932 |
| 1,931,945 | Zerk | Oct. 24, 1933 |
| 1,932,445 | Burns | Oct. 31, 1933 |
| 2,089,786 | Eason | Aug. 10, 1937 |
| 2,198,780 | McPherson | Apr. 30, 1940 |
| 2,308,967 | Kuss | Jan. 19, 1943 |
| 2,326,451 | Fawick | Aug. 10, 1943 |

FOREIGN PATENTS

| Number | Country | Date |
| --- | --- | --- |
| 213,019 | Great Britain | Mar. 27, 1924 |
| 257,009 | Great Britain | Aug. 19, 1926 |
| 282,188 | Great Britain | July 15, 1927 |
| 415,122 | Great Britain | Aug. 20, 1934 |